United States Patent
Reichenbach et al.

[11] Patent Number: 5,866,893
[45] Date of Patent: Feb. 2, 1999

[54] METHOD AND DEVICE FOR READING A BAR CODE

[75] Inventors: Jürgen Reichenbach, Emmendingen; Heinrich Hippenmeyer, Freiamt, both of Germany

[73] Assignee: Sick AG, Waldkirch/Breisgau, Germany

[21] Appl. No.: 726,446

[22] Filed: Oct. 4, 1996

[30] Foreign Application Priority Data

Oct. 6, 1995 [DE] Germany ................. 195 37 368.5

[51] Int. Cl.⁶ .................................................. G06K 7/10
[52] U.S. Cl. ................................. 235/462; 235/463
[58] Field of Search ......................... 235/462, 472, 235/469, 470, 454, 463, 465

[56] References Cited

U.S. PATENT DOCUMENTS

| | | | |
|---|---|---|---|
| 4,125,765 | 11/1978 | Cowardin et al. | 235/462 |
| 4,135,663 | 1/1979 | Nojiri et al. | 235/463 |
| 4,147,295 | 4/1979 | Nojiri et al. | 235/463 |
| 4,245,152 | 1/1981 | Flurry et al. | 235/463 |
| 4,567,361 | 1/1986 | Rosenthal | 235/463 |
| 5,166,500 | 11/1992 | Yoon et al. | 235/463 |
| 5,245,167 | 9/1993 | Takenaka | 235/462 |

FOREIGN PATENT DOCUMENTS

| | | |
|---|---|---|
| 0 634 730 A2 | 1/1995 | European Pat. Off. . |
| 2 343 447 | 4/1974 | Germany . |
| 42 08 082 C1 | 2/1993 | Germany . |

*Primary Examiner*—Thien Minh Le
*Attorney, Agent, or Firm*—Townsend and Townsend and Crew LLP

[57] ABSTRACT

A method and an apparatus are set forth for the reading of a bar code consisting of a predetermined number of code elements in which a bar code reader which scans the code elements generates a binary signal with sequential high-low phases, the lengths of which correspond to the widths of the sequentially scanned code elements. Only those high-low phases whose lengths lie within a defined region are processed further as permissible code elements. Permissible code elements belonging to directly sequential high-low phases are respectively grouped into segments, and only those segments are processed further as being permissible which have at least the predetermined number of code elements. If the number of code elements of a permissible segment exceeds the predetermined number, the code elements which actually belong to the bar code to be found are determined by a start marking, a stop marking and/or a center marking contained in the segment and the bar code which has been found is decoded.

17 Claims, 1 Drawing Sheet

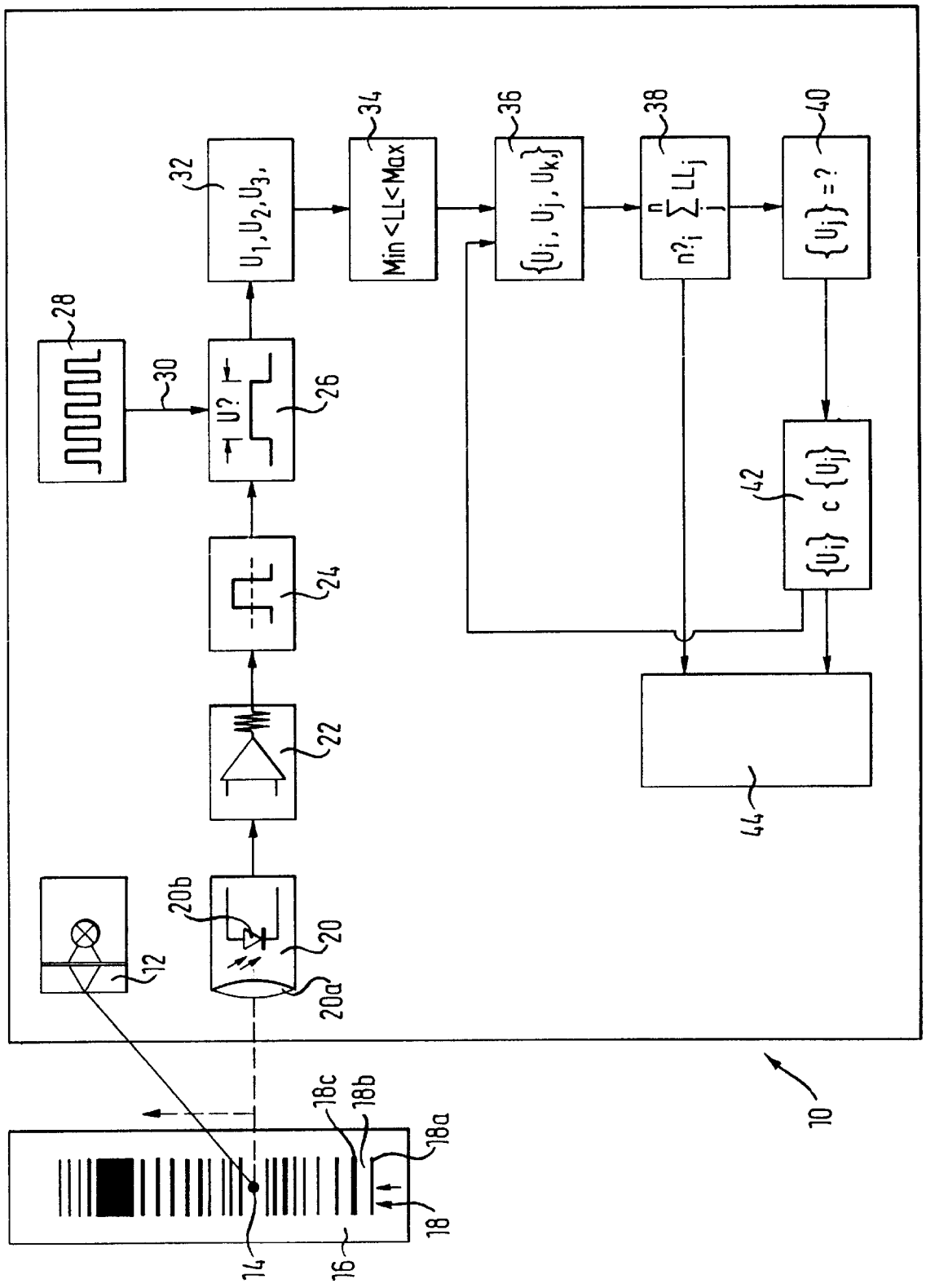

METHOD AND DEVICE FOR READING A BAR CODE

FIELD OF THE INVENTION

The present invention relates to a method and to an apparatus for the reading of a bar code consisting of a predetermined number of code elements in which a bar code reader which senses the code elements generates a binary signal with sequential high-low phases, the lengths of which correspond to the widths of the sequentially scanned code elements.

DESCRIPTION OF THE PRIOR ART

Bar code readers are known which use a bar code sensing unit with a light transmitter which guides a light bead over a surface on which a bar code consisting of light and dark fields is printed. The light scattered backwardly by the code elements is received by means of a light receiver provided in the bar code scanner unit and is subsequently evaluated.

In the previously known bar code readers an adequately broad region of constant brightness must be provided at least in front of the code, so that a code applied to the surface to be scanned can be recognized as such in the environment of other light and dark elements, such as letters, pictures, etc. These broad regions which are normally bright, and thus termed "white zones" or "white shoulders", serve for the separation of code information from the printed environment. They are, however, not desired because they increase the space required for the printing of a code, which, on the one hand, reduces the information density and, on the other hand, is undesired for reasons of design, for example when printing the code onto consumer goods.

It can, moreover, transpire that an individual printed element of the environment is erroneously regarded as a result of its width as a white shoulder or as an element of the bar code.

It is an object of the present invention to provide an improved method and an improved apparatus of the initially named kind, with which an at least substantially fault-free recognition of the code applied to the surface is ensured, in particular in a simple and cost-favorable manner.

BRIEF DESCRIPTION OF THE INVENTION

With a method in accordance with the invention this object is satisfied in that only those high-low phases whose lengths lie within a defined range are further processed as permissible (reliable) code elements; in that permissible code elements belonging to directly sequential high-low phases are respectively grouped together into segments; in that only those segments are further processed as permissible which have at least the predetermined number of code elements; in that, in the event that the number of code elements of a permissible segment exceeds the predetermined number, the code elements which actually belong to the bar code to be determined are specified by means of a start marking, a stop marking and/or a center marking contained in the segment; and in that the bar code which is found is decoded.

With an apparatus in accordance with the invention this object is satisfied by a width selection stage for selecting only those binary signal phases whose lengths lie within a defined range as permissible code elements for further processing, by a segmenting stage connected after the width selection stage for combining permissible code elements which belong to directly sequential binary signal phases into segments, and a segment selection stage for selecting only those segments for decoding which have at least the predetermined number of code elements and for rejecting all those segments which have less than the predetermined number of code elements.

Through the further processing of only those high-low phases whose lengths lie within a defined range as being permissible code elements, through the respective grouping of permissible code elements belonging to directly sequential high-low phases into segments, and through the subsequent further processing of only those segments as permissible which have at least the predetermined number of code elements—instead of a white shoulder—known information specified in the norming of the code is used, via the code, in order to reliably distinguish the code from the printed environment.

Thus account is taken of the fact that individual sequential fields of the printed environment can occasionally be confused at random with a low probability between light and dark as having a width such as is provided in the code. However, the probability of such a multiple repetition of such dark-light transitions directly after one another drops off, in particular exponentially, relative to the number of the code elements provided in the code norm and can thus be ignored in practice for codes with customary lengths.

Thus, in accordance with the invention, the high-low phases can be further processed completely independently of the recognition of a white shoulder in the preceding code elements or of elements of the printed environment, so that the code can also be recognized even if no white shoulder adjoins it.

As a result of the evaluation of the information specified in the norming of the code in accordance with the invention, via the permissible width of the code elements and the permissible number of code elements per bar code, a correct evaluation can indeed take place even when the printed environment itself has the form of a bar code, since the bar code to be read can be extracted in accordance with the invention from the printed environment.

In accordance with the invention it is possible, when using a code for which a number of permissible widths is provided for each code element, for the minimum length of the high-low phases to correspond to the narrowest permissible code element width and for the maximum length to correspond precisely to the broadest permissible code element width.

When the predetermined number of code elements in the code jointly adopts a predetermined summed width, provision can be made in accordance with the invention that only those segments are considered as permissible whose total width corresponds at least to this envisaged sum width. In this manner one not only uses the already named information contained in the code norm concerning the individual code element to distinguish between the printed environment and the bar code, but also uses the predetermined total width of a bar code, which further improves the recognition.

In a preferred embodiment of the invention, the bar code has a plurality of signs which respectively consist of a predetermined number of code elements. An example for such a code is the EAN-code in which a sign respectively consists of four code elements (two bars, two gaps), with the summed width of the code elements of a sign corresponding to seven times the thinnest code element which can be selected in the context of the code.

The reliability of the method of the invention can in this case also be further improved in that only those segments are considered permissible for which the summed widths found with respect to all the marks contained therein respectively correspond to the said value. When carrying out this check it is, however, sensible to not only admit those segments for which the summed width of the signs contained is precisely the same as the preset value, but it is recommended to set a permissible range for the permissible summed width, since the summed widths can fluctuate within a certain bandwidth as a consequence of print inaccuracies, of oblique scanning or of varying distances of the code elements from the scanner.

In accordance with the invention provision can further be made for the code elements for which a determination is made, with respect to the start signals, stop signals or center signals contained in the segment, that they actually belong to the bar code to be read, to be separated from the segments as a permissible bar code and for the remaining residual segments to be investigated to see whether further segments which are permissible for further processing are contained therein. In this way it can be ensured that a plurality of bar codes arranged directly alongside one another on the surface to be scanned can be distinguished from one another and separately decoded.

BRIEF DESCRIPTION OF THE DRAWINGS

FIG. 1 is a block diagram of an apparatus for carrying out the method of the invention.

DESCRIPTION OF PREFERRED EMBODIMENTS

In accordance with FIG. 1 a code 18 arranged on a surface 16 includes bright and dark fields 18a, 18b, 18c which jointly form a predetermined number of sequential code elements. For each code element there is defined a number of permissible widths and the code elements of a code can, for example, also jointly adopt a predetermined sum width.

This code 18 is scanned by an apparatus 10 which includes a light transmitter 12. The light transmitter 12 guides a light bead 14 preferably periodically in sequence over the code 18 applied to the surface 16.

The light and dark fields 18a, 18b, 18c which are irradiated by the light bead 14 scatter light into a light receiver 20 of the apparatus 10 where it is, for example, focused via a lens 28a onto a light sensitive element 20b.

The light receiver 20 transmits an electrical analog signal at its output which corresponds to the intensity of the received and backwardly scattered light and this analog signal is for example amplified by an analog amplifier 22 and then fed to a processing stage 24 for forming a binary signal, with the output of the processing stage 24 always changing when the analog signal applied to its input has a change of the light intensity scattered back to the receiver corresponding to a transition between a light and a dark field.

The processing stage 24 for forming a binary signal can, for example, be formed by a comparator at the output of which a high phase signal is generated when light is scattered backwardly by a bright field, and at the output of which a low phase signal is transmitted when light is scattered backwardly from a dark field. For this purpose, the amplified electrical analog signal can be evaluated using a predetermined threshold.

The output of the processing stage 24 for forming a binary signal is connected to a phase length determination stage 26 which has a second input connected via a clock line 30 to a clock generator 28. The phase length determination stage counts the clock pulses which occur between two level changes of the binary signal and transmits the clock pulse numbers that are found as the high-low phase length for a bright or dark field to a memory 32 in which all phase lengths of a scanning process are deposited in sequence.

The sequentially deposited phase lengths in the memory 32 are transmitted to a width selection stage 34. In the width selection stage 34 a check is first made for each individual phase length as to whether a phase length falls into the specified range, in order in this manner to select only binary signal phases whose lengths lie within this defined range as permissible code elements for the further processing. For this purpose, an investigation is first made in the width selection stage whether the phase length at least has a predetermined minimum size which preferably corresponds to the narrowest width provided in the code. An investigation is then made whether the phase length is also smaller than a predetermined maximum size which preferably corresponds to the largest width provided in the code.

The width selection stage 34 transmits sequential permissible code elements at its output in sequence until a phase length is found which has a width which does not fall within the range provided. On the occurrence of such a phase length, a segmenting signal is transmitted by the width selection stage to the segmenting stage 36.

In the segmenting stage 36 segments which correspond to a sequence of permissible code elements are formed from the signals received from the width selection stage 34. These segments are passed on in sequence from the segmenting stage 36 to the segment selection stage 38. In the segment selection stage 38 the number of sequential code elements in each of the segments is determined and compared with the number of code elements preset in the code. Only those segments which at least include the predetermined number of code elements are selected by the segment selection stage 38 for further processing.

In addition, the sum width of all the code elements contained in a segment can be determined in the segment selection stage 38 for bar codes in which all code elements jointly have a predetermined sum width and can be compared with the sum width provided for the bar code in order to select only those segments for the further processing whose total width corresponds to the sum width provided in the code.

When the number of the code elements of a segment corresponds precisely to the predetermined number and/or when the sum width corresponds to the total width provided, then the corresponding segment is supplied directly to a decoding stage 44 which can at once decode the segment even without prior detection of the white shoulder, for which any desired known method can be used.

When the number of the code elements present in the segment is in contrast greater than the predetermined number and/or the sum width of the segment exceeds the code element sum width that is provided, then the corresponding segment is transmitted to a pattern identification stage 40 in which a search is made in accordance with a prior known pattern. With this arrangement provision can, for example, be made that a start sign or stop sign or an eventually present white shoulder can be selected as the known pattern which is being sought. Furthermore, a search can optionally be made for a central sign, for example when the type of code involved is an EAN/UPC code.

On identifying a previously known pattern of this kind its position in the segment is transmitted together with the segment to a grouping stage 42 which isolates from the segment, starting from the position of the identified pattern, a group of sequential code elements belonging to the respective bar code which can then be passed on further to the decoding stage 44. The remaining residual segment can, if necessary, be directed back to the segment selection stage 38 in order to investigate the residual segment to see whether further coded information is contained.

The present invention thus makes it possible to reliably distinguish a code from the printed environment without requiring the identification of the white shoulder necessary in the prior art. The circuits required to implement the apparatus are of a very simple design.

What is claimed is:

1. An apparatus for reading a bar code having a predetermined number of code elements, the apparatus comprising a bar code sensing unit for sensing sequential code elements and transmitting a sensing signal, a processing stage for forming from the sensing signal a binary signal having high-low phases with lengths corresponding to widths of the sequentially sensed code elements, a width selection stage for selecting only those binary signal phases whose lengths lie within a preset range as permissible code elements for further processing, a segmenting stage connected after the width selection stage for combining permissible code elements which belong to directly sequential binary signal phases into segments, and a segment selection stage for selecting only the segments for decoding which have at least a predetermined number of code elements and for rejecting the segments which have less than the predetermined number of code elements.

2. An apparatus in accordance with claim 1, further comprising a pattern recognition stage connected after the segment selection stage for determining the code elements which belong to the bar code by means of a marking contained in the segment in the event that the number of code elements of a segment selected by the segment selection stage exceeds the predetermined number.

3. An apparatus in accordance with claim 2 wherein the marking contained in the segment is a start marking.

4. An apparatus in accordance with claim 2 wherein the marking contained in the segment is stop marking.

5. An apparatus in accordance with claim 2 wherein the marking contained in the segment is a center marking.

6. A method of reading a bar code having a predetermined number of code elements, the method comprising the steps of:

(a) scanning a plurality of code elements;

(b) generating a binary signal which includes sequential high and low phases from the plurality of code elements, the sequential high and low phases having lengths corresponding to widths of the scanned code elements;

(c) selecting, from the sequential high and low phases, permissible high and low phases having lengths that lie within a preset range;

(d) grouping the permissible high and low phases into segments, each segment having a series of directly sequential high and low phases;

(e) if a segment has a predetermined number of directly sequential high and low phases, then decoding the segment; and (f) if a segment has higher than the predetermined number of directly sequential high and low phases, then identifying a marking in the segment to isolate a code segment and decoding the isolated code segment.

7. A method in accordance with claim 6, wherein the step of identifying a marking in the segment comprises identifying a start marking of the isolated code segment.

8. A method in accordance with claim 6, wherein the step of identifying a marking in the segment comprises identifying a stop marking of the isolated code segment.

9. A method in accordance with claim 6, wherein the step of identifying a marking in the segment comprises identifying a center marking of the isolated code segment.

10. A method in accordance with claim 6, wherein the high and low phases are processed independently of recognition of a white shoulder in the code elements or in an area of the bar code.

11. A method in accordance with claim 6, further comprising the step of determining the lengths of the sequential high and low phases by counting clock pulses of each of the phases.

12. A method in accordance with claim 6, further comprising the step of identifying the preset range of lengths that correspond to a number of permissible widths of code elements.

13. A method in accordance with claim 12, wherein the identifying step includes setting a minimum length for the preset range which corresponds to a narrowest width of the number of permissible widths.

14. A method in accordance with claim 12, wherein the identifying step includes setting a maximum length for the preset range which corresponds to a broadest width of the number of permissible widths.

15. A method in accordance with claim 6, further comprising the steps of:

if a sum of the lengths of the series of directly sequential high and low phases in a segment corresponds to a summed width which is equal to a predetermined summed width of the predetermined number of code elements in the bar code, then decoding the segment; and if a sum of the lengths of the series of directly sequential high and low phases in a segment corresponds to a summed width which is greater than the predetermined summed width, then identifying a marking in the segment to isolate a code segment and decoding the isolated code segment.

16. A method in accordance with claim 6, wherein the bar code has a plurality of signs, each sign consisting of a predetermined number of code elements having a predetermined summed width, the method further comprising the step of, if a sum of the lengths of the series of directly sequential high and low phases in a segment with respect to all of the signs corresponds to a summed width which lies within a predetermined range of the predetermined summed width, then decoding the segment.

17. A method in accordance with claim 6, further comprising, subsequent to step (f), the steps of:

(g) separating a residual set of high and low phases of the segment from the isolated code segment;

(h) grouping the residual set of high and low phases into residual segments, each residual segment having a series of directly sequential high and low phases;

(i) if a residual segment has a predetermined number of directly sequential high and low phases, then decoding the segment; and (j) if a residual segment has higher than the predetermined number of directly sequential high and low phases, then identifying a marking in the residual segment to isolate a residual code segment and decoding the isolated residual code segment.

* * * * *